(12) United States Patent
Kalali

(10) Patent No.: US 9,898,344 B2
(45) Date of Patent: Feb. 20, 2018

(54) SYSTEM AND METHOD FOR PROVIDING CONFIGURATION MODULARITY IN AN APPLICATION SERVER, CLOUD PLATFORM, OR OTHER ENVIRONMENT

(71) Applicant: ORACLE INTERNATIONAL CORPORATION, Redwood Shores, CA (US)

(72) Inventor: Masoud Kalali, Kista (SE)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 105 days.

(21) Appl. No.: 14/476,583

(22) Filed: Sep. 3, 2014

(65) Prior Publication Data
US 2015/0089031 A1     Mar. 26, 2015

Related U.S. Application Data

(60) Provisional application No. 61/880,787, filed on Sep. 20, 2013.

(51) Int. Cl.
*G06F 15/16* (2006.01)
*G06F 9/50* (2006.01)
(Continued)

(52) U.S. Cl.
CPC ........ *G06F 9/5072* (2013.01); *G06F 9/44505* (2013.01); *H04L 41/0893* (2013.01);
(Continued)

(58) Field of Classification Search
CPC ...... G06F 9/5072; G06F 9/44505; G06F 8/60; H04L 41/0893; H04L 67/34; H04L 41/5096
(Continued)

(56) References Cited

U.S. PATENT DOCUMENTS 7,516,211 B1 * 4/2009 Gourlay .............. H04L 41/0816
370/356
7,577,722 B1 * 8/2009 Khandekar ......... G06F 9/45558
709/220
(Continued)

*Primary Examiner* — Bryan Lee
*Assistant Examiner* — Oluwatosin Gidado
(74) *Attorney, Agent, or Firm* — Tucker Ellis LLP

(57) ABSTRACT

In accordance with an embodiment, described herein is a system and method for providing configuration modularity in an application server, cloud platform, or other environment. For example, in a cloud computing environment, application server modules, e.g., WebLogic Server or GlassFish modules, can be embedded within the environment to provide various cloud platform functionalities. In accordance with an embodiment, the system comprises a configuration modularity logic for use in determining, for a particular application or service deployment, a configuration of application, module or service components, including determining if a configuration is provided by a global or domain configuration, determining if annotations are provided by the particular application or service deployment for use in configuring the application, module or service components, and/or determining if a default configuration is provided for use with the particular application or service deployment.

20 Claims, 13 Drawing Sheets

(51) Int. Cl.
*H04L 29/08* (2006.01)
*H04L 12/24* (2006.01)
*G06F 9/445* (2018.01)

(52) U.S. Cl.
CPC ............... *H04L 67/34* (2013.01); *G06F 8/60* (2013.01); *H04L 41/5096* (2013.01)

(58) Field of Classification Search
USPC ........................................................ 709/220
See application file for complete search history.

(56) References Cited

U.S. PATENT DOCUMENTS

| | | | | |
|---|---|---|---|---|
| 2013/0311778 A1* | 11/2013 | Cherukuri | ........... | H04L 63/0272 713/171 |
| 2016/0019636 A1* | 1/2016 | Adapalli | ............ | G06Q 30/0641 705/26.62 |

* cited by examiner

```xml
<?xml version="1.0" encoding="utf16"?>
<xsd:schema attributeFormDefault="unqualified" elementFormDefault="qualified"
version="1.0" xmlns:xsd="http://www.w3.org/2001/XMLSchema">
<xsd:element name="serviceconfig"
type="serviceconfigType"
/>
<xsd:complexType name="serviceconfigType">
<xsd:sequence>
<xsd:element maxOccurs="unbounded" name="configbundle"
type="configbundleType"
/>
</xsd:sequence>
</xsd:complexType>
<xsd:complexType name="configbundleType">
<xsd:sequence>
<xsd:element name="customizationtokens"
type="customizationtokensType"
/>
<xsd:element name="configurationelement"
type="configurationelementType"
/>
</xsd:sequence>
<xsd:attribute name="location" type="xsd:string" />
<xsd:attribute name="replaceifexist"
type="xsd:boolean" />
</xsd:complexType>
<xsd:complexType name="configurationelementType">
<xsd:attribute name="configbeanclassname"
type="xsd:string" />
</xsd:complexType>
<xsd:complexType name="customizationtokensType">
<xsd:sequence>
<xsd:element name="customizationtoken"
type="customizationtokenType"
minOccurs="0"/>
</xsd:sequence>
</xsd:complexType>
<xsd:complexType name="customizationtokenType">
<xsd:sequence>
<xsd:choice minOccurs="0">
<xsd:element name="port" type="portType" minOccurs="0"/>
```

```
<xsd:element name="file" type="fileType" minOccurs="0"/>
</xsd:choice>
</xsd:sequence>
<xsd:attribute name="title" type="xsd:string" />
<xsd:attribute name="name" type="xsd:string" />
<xsd:attribute name="defaultvalue"
type="xsd:int" />
<xsd:attribute name="validationexpression"
type="xsd:string" />
<xsd:attribute name="description" type="xsd:string" />
<xsd:attribute name="portbaseoffset"
type="xsd:int" />
</xsd:complexType>
<xsd:complexType name="fileType">
<xsd:attribute name="mustexist"
type="xsd:string" />
</xsd:complexType>
<xsd:complexType name="portType">
<xsd:attribute name="offset" type="xsd:int" />
</xsd:complexType>
</xsd:schema>
```

*FIGURE 6B*

```
<service-config>
    <config-bundle location="domain/configs/config[$CURRENT_INSTANCE_CONFIG_NAME]" replace-if-exist="false">
        <customization-tokens>
            <customization-token
                title="$jms.service.portNumber.title" name="JMS_PROVIDER_PORT"
                default-value="7676"
                validation-expression="\b((1-9][0-9]{0,3}|[1-5][0-9]{4}|6[0-4][0-9]{3}|65[0-4][0-9]{2}|655[0-2][0-9]|6553[0-5])\b"
                description="$jms.service.portNumber.description">
                <port base-offset="7676"></port>
            </customization-token>
        </customization-tokens>
        <configuration-element config-bean-class-name="com.sun.enterprise.connectors.jms.config.JmsService">
<![CDATA[
    <jms-service default-jms-host="default_JMS_host" type="EMBEDDED">
        <jms-host port="${JMS_PROVIDER_PORT}" host="localhost" name="default_JMS_host"/>
    </jms-service>
]]>
        </configuration-element>
    </config-bundle>
    <config-bundle location="domain/resources" replace-if-exist="false">
        <configuration-element config-bean-class-name="org.glassfish.connectors.config.ConnectorConnectionPool">
<![CDATA[
    <connector-connection-pool name="jms/__defaultConnectionFactory-Connection-Pool" max-pool-size="250" steady-pool-size="1" resource-adapter-name="jmsra" connection-definition-name="javax.jms.ConnectionFactory">
    </connector-connection-pool>
]]>
        </configuration-element>
    </config-bundle>
```

```
<config-bundle location="domain/resources" replace-if-exist="false">
    <configuration-element config-bean-class-name="org.glassfish.connectors.config.ConnectorResource">
<![CDATA[
    <connector-resource pool-name="jms/__defaultConnectionFactory-Connection-Pool" jndi-name="jms/__defaultConnectionFactory" object-type="system-all-req"></connector-resource>
]]>
    </configuration-element>
</config-bundle>
<config-bundle location="domain/servers/server[$CURRENT_INSTANCE_SERVER_NAME]" replace-if-exist="false">
    <configuration-element config-bean-class-name="com.sun.enterprise.config.serverbeans.ResourceRef">
<![CDATA[
    <resource-ref ref="jms/__defaultConnectionFactory"/>
]]>
    </configuration-element>
</config-bundle>
</service-config>
```

*FIGURE 7B*

```
/**
 * @param location the location of the config bean which this
 * configuration is intended to create
 * @param configBeanClassName what is the type of the config
 * bean this configuration is intended for
 * @param xmlConfiguration the XML snippet that represent the
 * mentioned configuration.
 * The XML snippet should be a valid config bean configuration
 * @param replaceCurrentIfExists should this config bean replace
 * an already existing one or not.
 * Note that, this parameter will be processed only if the
 * configuration is intended * for a named configuration element. The
 * other condition for the replace to happen is that this configuration
 * get the chance to be processed which means it should be part
 * of an array of config beans intended for a service that has no
 * configuration present in the domain.xml
 * @param customizationTokens
 * @param <U> Type of the config bean which is an extension of ConfigBeanProxy
 */
public <U extends ConfigBeanProxy> ConfigBeanDefaultValue(String location, String
configBeanClassName,
String xmlConfiguration, boolean replaceCurrentIfExists,
List<ConfigCustomizationToken> customizationTokens) {
this.location = location;
this.xmlConfiguration = xmlConfiguration;
this.configBeanClassName = configBeanClassName;
this.replaceCurrentIfExists = replaceCurrentIfExists;
this.customizationTokens = customizationTokens;
}
/**
 * @param location the location of the config bean which this
 * configuration is intended to create
 * @param configBeanClassName what is the type of the config
 * bean this configuration is intended for
 * @param xmlSnippetFileInputStream An InputStream for the actual
 * configuration which might be a file or anything
 * other InputStream to read the configuration from.
 * @param replaceCurrentIfExists should this config bean replace
 * an already existing one or not. Note that, this parameter will
 * be processed only if the configuration is intended for a
```

```
 * that this configuration get the chance to be processed which means
 * it should be part of an array of config beans intended for a
 * service that has no configuration present in the domain.xml
 * @param customizationTokens
 * @param <U> Type of the config bean which is an extension of ConfigBeanProxy
 * @throws Exception If the stream is not readable or closing the
 * stream throws exception constructor will fail with the exception.
 */
public <U extends ConfigBeanProxy> ConfigBeanDefaultValue(String location, String
configBeanClassName,
InputStream xmlSnippetFileInputStream,
boolean replaceCurrentIfExists,
List<ConfigCustomizationToken> customizationTokens) throws Exception {
this.location = location;
this.configBeanClassName = configBeanClassName;
this.xmlConfiguration = streamToString(xmlSnippetFileInputStream, "utf8")
;
this.replaceCurrentIfExists = replaceCurrentIfExists;
this.customizationTokens = customizationTokens;
}
```

SYSTEM AND METHOD FOR PROVIDING CONFIGURATION MODULARITY IN AN APPLICATION SERVER, CLOUD PLATFORM, OR OTHER ENVIRONMENT

CLAIM OF PRIORITY

This application claims the benefit of priority to U.S. Provisional Application titled "SYSTEM AND METHOD FOR PROVIDING CONFIGURATION MODULARITY AND OTHER FUNCTIONALITY IN A CLOUD PLATFORM ENVIRONMENT", Application No. 61/880,787, filed Sep. 20, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present application is generally related to application servers, and cloud environments, and is particularly related to a system and method for providing configuration modularity in an application server, cloud platform, or other environment.

BACKGROUND

Application servers, for example WebLogic Server or GlassFish servers, enable an organization to run complex software applications. A cloud computing environment enables responsibilities which previously may have been provided by an organization's own information technology department, to be delivered as service layers within a cloud environment, for use by consumers that are internal (i.e., private) or external (i.e., public) to the organization. However, in typical application server and cloud environments, the configuration of application server or cloud environment modules is defined globally, e.g., by a domain configuration file, which requires reconfiguration when, for example, new modules are added to the system. These are examples of the types of environment in which embodiments of the invention can be used.

SUMMARY

In accordance with an embodiment, described herein is a system and method for providing configuration modularity in an application server, cloud platform, or other environment. For example, in a cloud computing environment, application server modules, e.g., WebLogic Server or GlassFish modules, can be embedded within the environment to provide various cloud platform functionalities. In accordance with an embodiment, the system comprises a configuration modularity logic for use in determining, for a particular application or service deployment, a configuration of application, module or service components, including determining if a configuration is provided by a global or domain configuration, determining if annotations are provided by the particular application or service deployment for use in configuring the application, module or service components, and/or determining if a default configuration is provided for use with the particular application or service deployment.

BRIEF DESCRIPTION OF THE FIGURES

FIGS. 6A-6B illustrates an example module configuration file schema for use with configuration modularity, in accordance with an embodiment.

FIGS. 7A-7B illustrates an example module configuration for use with configuration modularity, in accordance with an embodiment.

FIGS. 8A-8B illustrates an example constructor for use with configuration modularity, in accordance with an embodiment.

DETAILED DESCRIPTION

As described above, application servers, for example WebLogic Server or GlassFish servers, enable an organization to run complex software applications. A cloud computing environment enables responsibilities which previously may have been provided by an organization's own information technology department, to be delivered as service layers within a cloud environment, for use by consumers that are internal (i.e., private) or external (i.e., public) to the organization.

In some instances, application server modules, e.g., WebLogic Server or GlassFish modules, can be embedded within a cloud environment to provide various cloud platform functionalities. However, in typical application server and cloud environments, the configuration of such modules is defined globally, e.g., by a domain configuration file, which requires reconfiguration when, for example, new modules are added to the system.

For example, in a typical application server environment, the configuration information that is required to configure and execute a ConfigBean as part of a software application or module may be expressed in different ways, including, for example: (1) in the domain configuration in a "defaultValue" arguments to an @Attribute annotations associated with the ConfigBeans; (2) in @NotNull annotations on @Elements associated with the ConfigBeans; or (3) in a configuration file (for example, a domain.xml file) that can be modified by an application server end user or administrator, and is used to create and configure an application domain or to modify the server behavior. Each of these techniques generally define configuration data at a global location for a particular domain.

Figure 1:
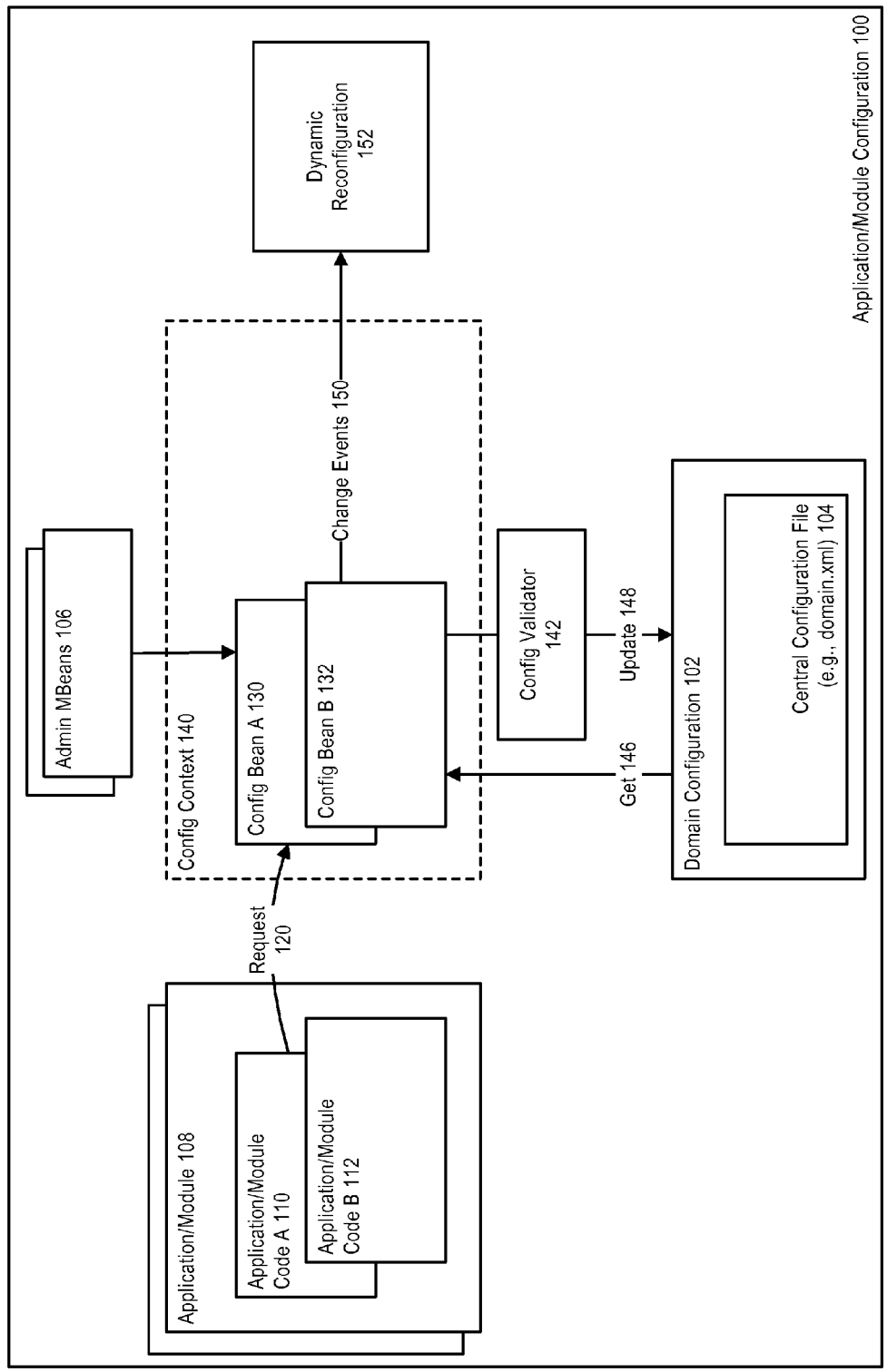
FIG. 1 illustrates an exemplary application server config bean configuration, in accordance with an embodiment.

FIG. 1 illustrates an exemplary application server config bean (e.g., ConfigBean) configuration, in accordance with an embodiment.

As illustrated in FIG. 1, in a typical application/module configuration environment 100, in which applications or modules 108 include software code A 110, B 112 that make requests 120 on config beans (such as ConfigBeans), much of the configuration information is provided as a domain configuration 102, for example as a central configuration (e.g., domain.xml) file 104. Config beans 130, 132 can be associated with a config context 140, and provide a means of backend configuration access and modification, including an API that supports get and update operations 146, 148 for various configuration elements, attributes, and properties. One or more admin mbeans 106 provide an API that supports JMX clients, such as GUIs and CLIs. A config validator 142 provides a means of verifying configurations and preventing illegal configuration changes. Change events 150 can be handled by a dynamic-reconfig component 152 which provides an API for handling dynamic reconfiguration requests.

However, in a typical environment, the loss of modularity presents difficulties for defining software distributions, applications, or services for which the list of modules might vary. For example, different application or service distributions may require different domain.xml files, or alternatively the distributions must ship with data for modules that are not included in the distribution. Default configuration data for all modules may be merged together into a single file, which results in configuration data for all services being loaded into memory even though some services may not be used, which in turn leads to memory and performance problems.

Configuration Modularity

In accordance with an embodiment, described herein is a system and method for providing configuration modularity in an application server, cloud platform, or other environment. For example, in accordance with an embodiment, a new application or service module can be added to a distribution without needing to specify additional configuration data in a default central configuration (e.g., domain.xml) file. Instead, a default configuration for modules can be distributed between the modules rather than being kept within a global or domain configuration file.

In accordance with an embodiment, in a cloud computing environment, application server modules, e.g., WebLogic Server or GlassFish modules, can be embedded within the environment to provide various cloud platform functionalities. In accordance with an embodiment, the system comprises a configuration modularity logic for use in determining, for a particular application or service deployment, a configuration of application, module or service components, including determining if a configuration is provided by a global or domain configuration, determining if annotations are provided by the particular application or service deployment for use in configuring the application, module or service components, and/or determining if a default configuration is provided for use with the particular application or service deployment.

Support for modularity of default configuration data provides several benefits, including allowing new modules to be defined with embedded default configuration data, without having to modify a global file such as the default domain.xmlfile.

For example, in accordance with an embodiment, a module can be included into various software distributions without requiring a copy of its default configuration data be included in a distribution-specific file. Maintenance of the module software that requires a change to the default configuration data only requires modifying the module, not a global file. This is also beneficial for third-party module developers since a module, including its default configuration data, can be included without making a global change. Additional benefits include that, if a user has not modified the default configuration data for a module, that data need not be written to the domain's domain.xml file, even though the data is available to the module at runtime.

Configuration Sources

Figure 2:
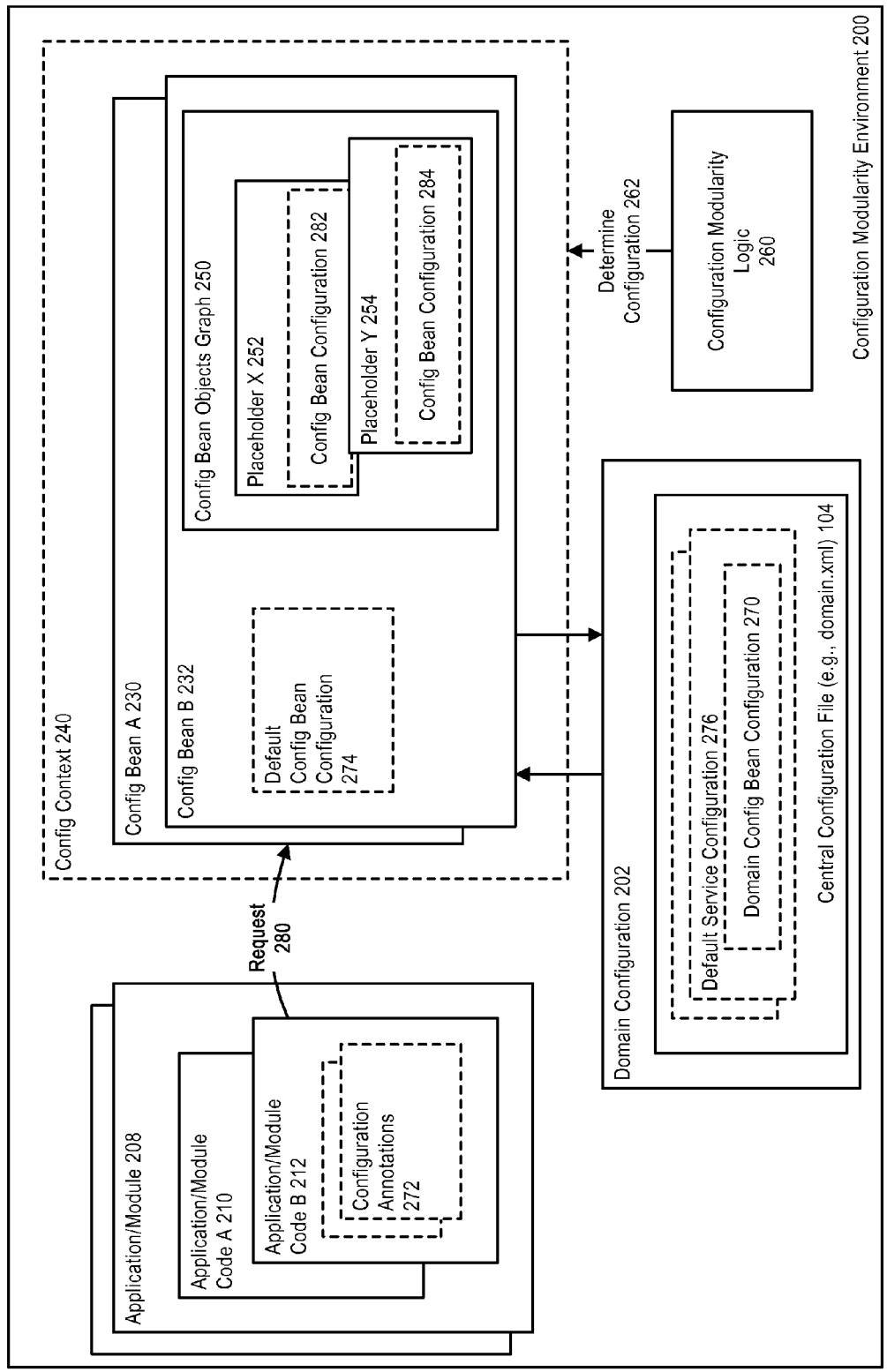
FIG. 2 illustrates a system for providing configuration modularity in an application server, cloud platform, or other environment, in accordance with an embodiment.

FIG. 2 illustrates a system for providing configuration modularity in an application server, cloud platform, or other environment, in accordance with an embodiment.

As shown in FIG. 2, in accordance with an embodiment, a modular configuration environment 200 can include a domain configuration 202, for example as a central configuration (e.g., domain.xml) file 204. Applications, module or services 208, including application/module code 210, 212, can make requests to application, module or service components, for example config beans 230, 232, as part of a config context 240.

In accordance with an embodiment, when a config bean is requested by a client code in connection with a particular module, there are three possible sources to get the configuration, populate the config bean's object graph 250, and return a config bean proxy (ConfigBeanProxy):

(1) If the configuration for the requested config bean exists in the central configuration file (270) it will take precedence and will be used to determine the config bean component's configuration.

(2) If there is no configuration for the requested config bean in the central configuration file, then configuration modularity will be used to determine if the config bean has a custom configuration. In accordance with an embodiment, this can be provided by querying for the presence of configuration annotations (272). If the right annotation is present, the configuration modularity logic will create the ConfigBeanProxy using the configuration provided with the module, and return that to the caller. In accordance with an embodiment, configuration modularity can be used to modify an already-present configuration when a new module is being installed. For example, the ActivateOnStartup pattern, described in further detail below, can be used to provide a startup service which processes a configuration bundled with a new module, and uses it to replace an existing configuration to make it match the newly installed module. As an illustrative example, a GlassFish open source installation may be provided with a caching module and caching implementation named BasicCache which implements the Cache contract; while a commercial installation may be provided with an AdvancedCache implementation. If an administrator updates their open source installation to a commercial installation by downloading and installing appropriate modules, the newly incoming modules can cause the configuration of the domain to change to use the new implementation, by replacing the value of the attribute that specifies the class name for the Cache contract implementation.

(3) If none of the above sources are provided, then the configuration for the config bean can be created using a generalized procedure based on default configuration information (274, 276). This procedure creates the config beans using the annotations provided in the config beans at the moment these annotations are mentioned, for example by CurrentDefaultConfigSources.

In accordance with an embodiment, when a request 280 is received to deploy or access the application, a configuration modularity logic 260 will determine a configuration 262, including populating placeholders 252, 254 in the config beans object graph with appropriate configuration information 282, 284.

In accordance with an embodiment, a default service configuration can be the configuration provided for a particular service in the central configuration file. For example, a JMS service configuration can be provided as:

```
<jmsservice defaultjmshost="default_JMS_host" type="EMBEDDED">
<jmshost port="7676" host="localhost"
name="default_JMS_host"></jmshost>
</jmsservice>
``` which is more fully illustrated in FIGS. 7A-7B, and is described in further detail below.

In the various examples illustrated herein, configuration elements, attributes, and properties are generally indicated in camel case in Java source format (e.g., defaultValue), and with "-" separated names in XML format (e.g., default-value). In the example shown, custom token values can be specified by a user at domain creation time. For example, in the above service configuration the port="7676" is a custom token which refers to a property of the module's configuration data that can be provided by the user during domain creation time.

In accordance with an embodiment, a location attribute or placeholder is used to indicate where in a config bean objects graph (e.g., domain.xml representation) a configuration should be placed. For example, a location attribute $CURRENT_INSTANCE_CONFIG_NAME can be resolved at runtime to the config name that is being used by the server owning the current context:

location="domain/configs/config[$CURRENT_INSTANCE_CONFIG_NAME]"

In accordance with an embodiment, other types of placeholder can be used, for example: (1) a CURRENT_INSTANCE_CONFIG_NAME, which maps to name of the current instance config's name during runtime. If no name is present, the value of this will be used implicitly; (2) a CURRENT_INSTANCE_CONFIG_SERVER, which maps to name of the current instance server's name during runtime. If no name is present, the value of this will be used implicitly; and (3) a DEFAULT_CONFIG_NAME, which maps to "default-config" or another default name.

Figure 3:
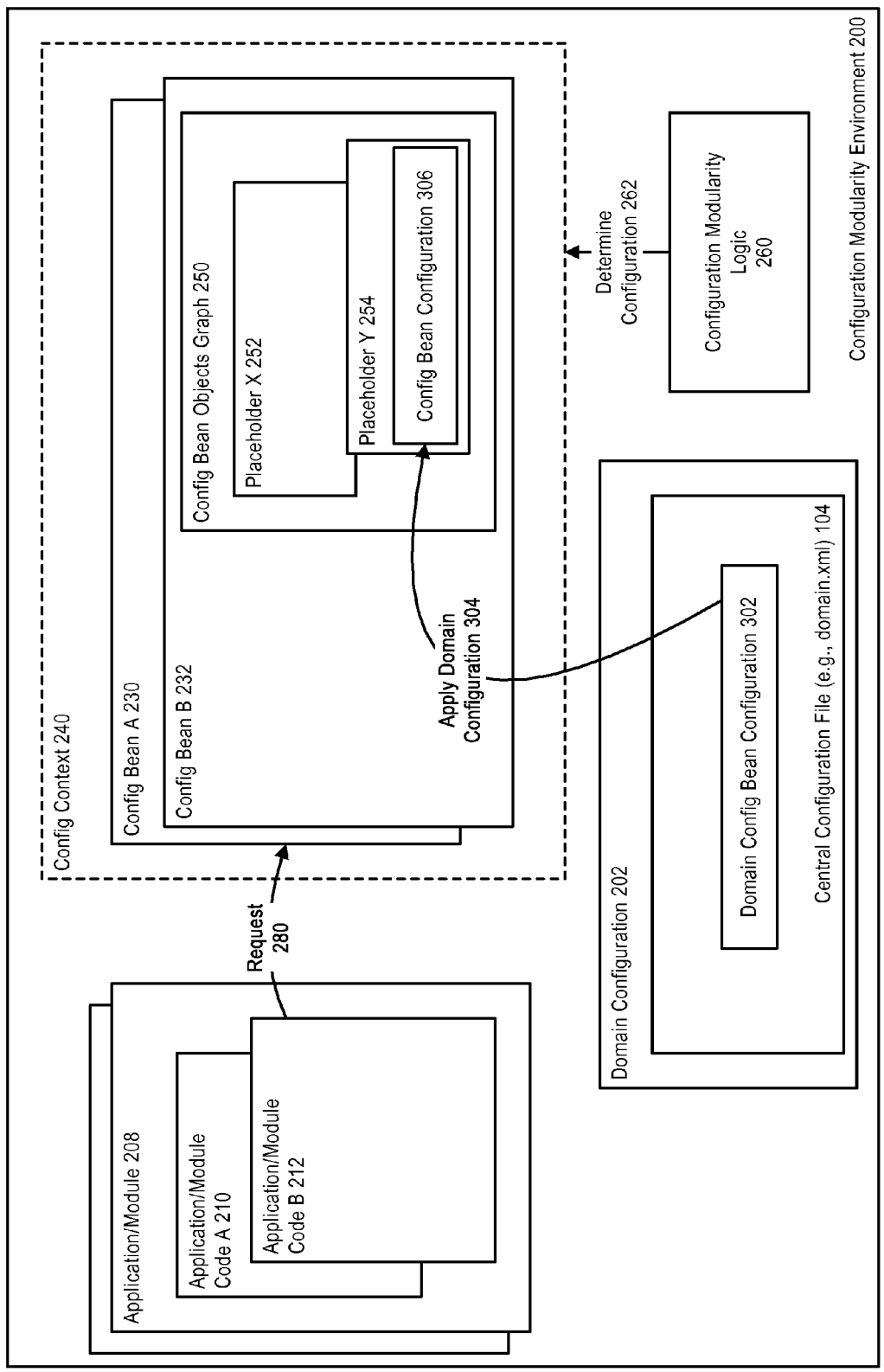
FIG. 3 illustrates the use of configuration modularity, in accordance with an embodiment.

FIG. 3 illustrates the use of configuration modularity, in accordance with an embodiment.

As shown in FIG. 3, in accordance with an embodiment, a determination is made as to whether the configuration of components is provided by a domain central configuration (e.g., a domain.xml) file 302. If it is determined that the configuration of components is provided by a domain configuration, then the domain configuration is used 304 to configure the placeholders 306 associated with the component configuration.

Figure 4:
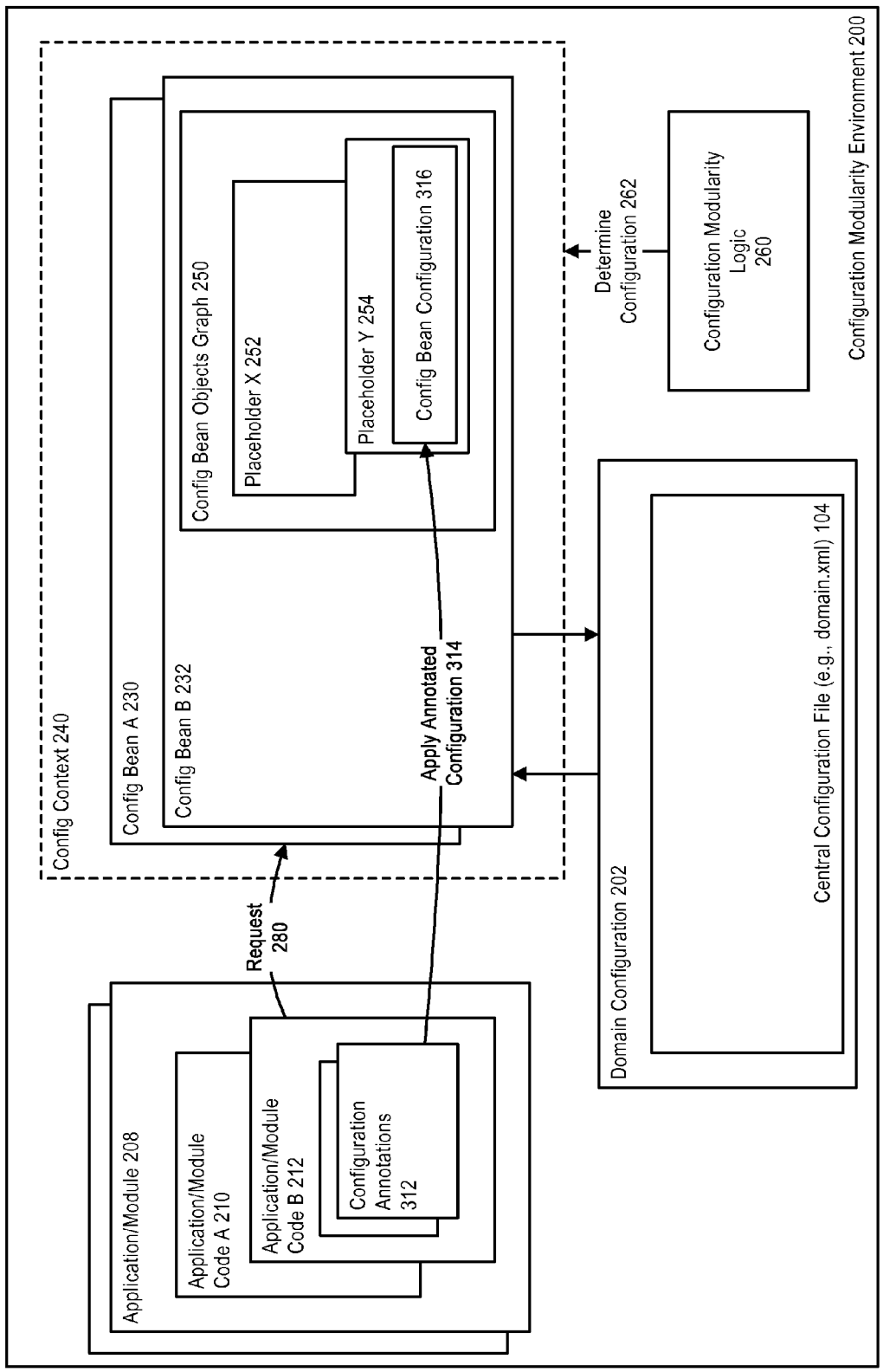
FIG. 4 further illustrates the use of configuration modularity, in accordance with an embodiment.

FIG. 4 further illustrates the use of configuration modularity, in accordance with an embodiment.

As shown in FIG. 4, in accordance with an embodiment, a determination is made as to whether annotations 312 are provided by the particular application/module or service deployment for use in configuring its components. If it is determined that annotations are provided by the particular application/module or service deployment for use in configuring its components, then the provided annotations are used 314 to configure the placeholders 316 associated with the component configuration.

Figure 5:
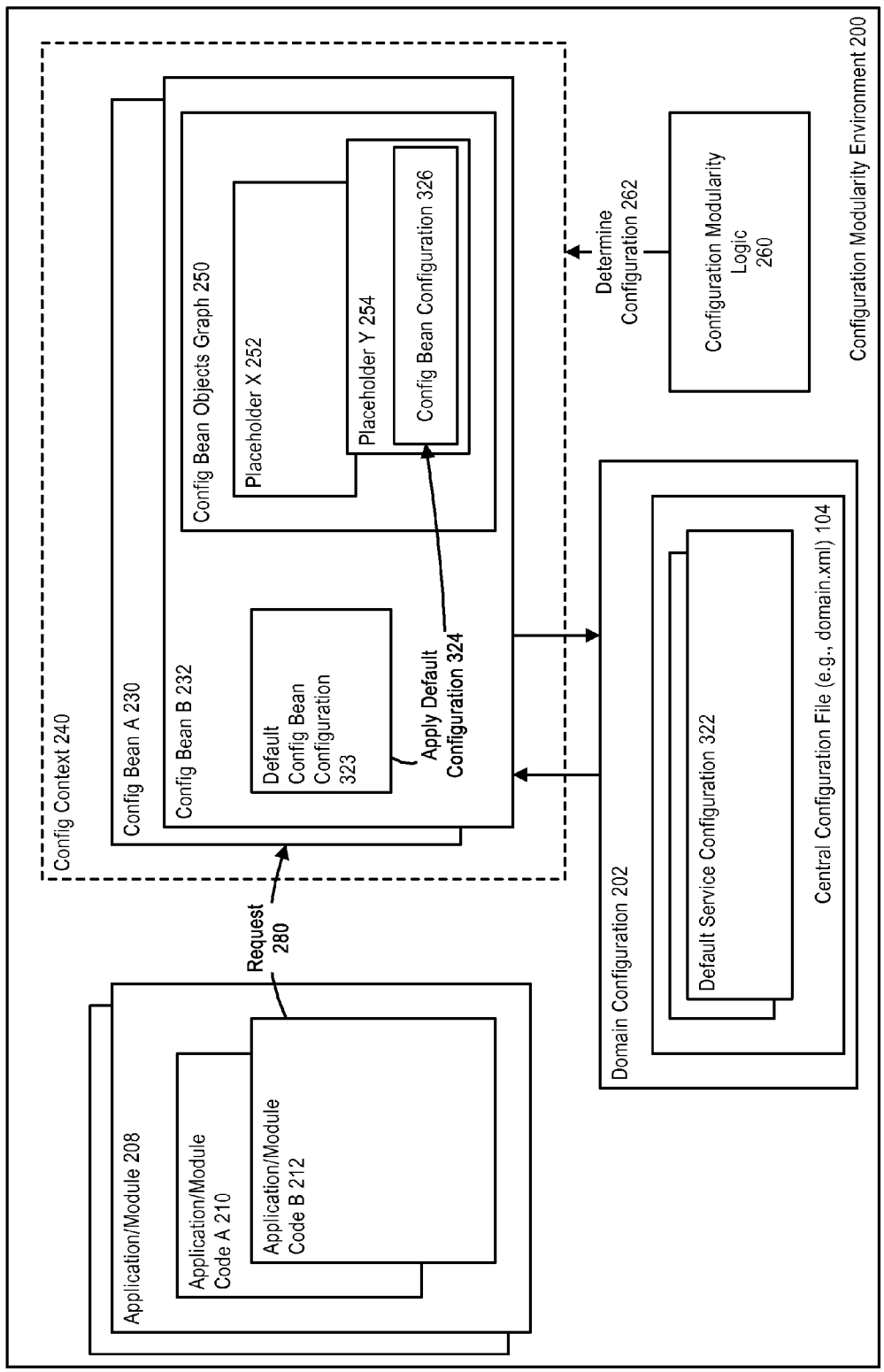
FIG. 5 further illustrates the use of configuration modularity, in accordance with an embodiment.

FIG. 5 further illustrates the use of configuration modularity, in accordance with an embodiment.

As shown in FIG. 5, in accordance with an embodiment, a determination is made as to whether a default configuration, such as a default service configuration 322, or default config bean configuration 323, is provided for use with the particular application/module or service and, if such default configuration is provided, then the default configuration is used 324 to configure the placeholders 326 associated with the configuration of the application/module or service components.

Configuration File Format

FIGS. 6A-6B illustrates an example module configuration file schema 330 for use with configuration modularity, in accordance with an embodiment. As shown in FIGS. 6A-6B, in accordance with an embodiment, examples of configuration elements defined according to the schema shown therein can include:

config-bundle: a container element to hold a config bean and its related customization tokens. Exemplary attributes can include location—the location of the config bean in the config bean graph; and replace-if-exist—if the config bean exists, whether it should be replaced with the new configuration.

customization-token: this element can be used to indicate that a config bean requires customization data during domain creation. Exemplary attributes can include title—the title for this customization object as it should be shown to the user; name—a name of the token as it will be stored in a system property in the central configuration file; default-value—the default value if the user decides to go with the default value; and description—a description of this token. In accordance with an embodiment, a customization token can include a validation expression which allows the application server installation/configuration to validate the user input against the validation expression. For example, in accordance with an embodiment, a String customization token can be used to collect a simple String during domain creation, and can include a validation expression which allows the application server installation/configuration to validate the String input. A String customization type has no sub element, and the customization-token contains everything required, for example:

```
<customization-token
    title="$jms.service.portNumber.title"
    name="JMS_PROVIDER_PORT"
    default-value="7676"
    validation-expression="\b([1-9][0-9]{0,3}|[1-5][0-9]{4}|6[0-4][0-9]{3}|65[0-4][0-9]{2}|655[0-2][0-9]|6553[0-5])\b"
    description="$jms.service.portNumber.description">
    <port base-offset="7676"></port>
</customization-token>
``` port: this element can be used to indicate that the default value is of type port, and when a domain is created using—portbase, the offset will be used to determine the value for this customization token. Exemplary attributes can include port-base-offset—specifies that the default value for this customization token is a port and a hint for domain creation process on what can be the port number when the domain has been created using—portbase.

file: this element can be used to specify that the customization token is a file. Exemplary attributes can include must-exist—specifies that the default value for this customization token is a file that must exist.

configuration-element: this element provides a CDATA value which is the actual configuration of a config bean as it can appear in central configuration file. Exemplary attributes can include config-bean-classname—the config bean type the configuration targets.

In accordance with an embodiment, any token that is present in a module's configuration file indicates a potential value that user can input during domain creation, to create a domain with a custom configuration, e.g., custom port numbers.

In accordance with an embodiment, customization token title and description attributes can have localized values. The property should exist in a LocalStrings.properties file located in the same package as the class which is annotated by @CustomConfiguration annotation pointing to the module configuration file.

FIGS. 7A-7B illustrates an example module configuration 340 for use with configuration modularity, in accordance with an embodiment. In particular, FIGS. 7A-7B shows a sample module-config.xml document for JMS 2 integration with GlassFish, in accordance with an embodiment.

Customization Tokens

In accordance with an embodiment, a customization token can be a string token that is validated and persisted into central configuration file, if a custom value is provided during domain creation.

In accordance with an embodiment, a file customization token allows the module owners to specify a customization token that points to a file. By default, the file should exist in the location specified in the default/-value but, during a custom domain creation, the user can input a new location for the file.

In accordance with an embodiment, a port customization token will be used mainly when a custom domain is being created, e.g., by defining a domain using—portbase or by specifying the port numbers through an interactive process. When a module configuration is being processed and there is a customization token of type port in the configuration file, one of the following scenarios will commence: (1) the customization token's corresponding system-property already exist in the central configuration file; or (2) this module was not present during domain creation time and it is the first time that this particular config bean is being accessed. If there is not a portbase present the default port number will be persisted to the central configuration file and will be used for the module from then on, for example by persisting the value to central configuration file.

Configuration Modularity Annotations

In accordance with an embodiment, the following annotations can be used:

HasNoDefaultConfiguration: this annotation marks the config beans for which the configuration modularity logic should not try creating a default configuration. When annotated with this annotation, the only source of configuration for the config bean will be the central configuration file.

CustomConfiguration: to annotate a config bean that provides custom configuration for the module that it is bundled in. The custom configuration can be provided by a module configuration file, or produced on the fly. Exemplary attributes can include configFileBaseName—a base name for the module's configuration files. The base name will be used to form the actual file names that will be used to load the configuration depending on the runtime context type, e.g., DAS, Instance, Embedded; usesOnTheFlyConfigGeneration—if the config bean uses a @DuckTyped method to provide the configuration rather than using the configuration file.

HasCustomizationTokens: a marker to annotate a config bean that its specified module configuration file has customization tokens, e.g., a port number, that can be provided by the user during domain creation.

ActivateOnStartup: a marker to annotate a config bean that its provided configuration should be processed on application server startup, for example to override an older configuration.

ConfigExtensionMethod: specifies the method that is the source to query the config bean's extension by type.

In accordance with an embodiment, the configFileBaseName specifies a base name that gives enough information to the runtime to distinguish the file name for each type of runtime if the configuration for each type of runtime is different from one another. For example, for a JMS module, the configFileBaseName's value can be jms-service.xml. Based on this name, the configuration modularity logic will try to load the following files for each type of runtime: DAS (Admin): admin-jms-service.xml, or as a fallback jms-service.xml; Instance: instance-jms-service.xml, or as a fallback jms-service.xml.

On the Fly Creation of Module Configuration

In accordance with an embodiment, if a module owner, for any reason, needs to implement a custom logic to generate the default configuration, they can do it by adding the following @DuckTyped method to the config bean and implement it in the Duck class.

```
@DuckTyped
public List<ConfigBeanDefaultValue> getDefaultValues(String runtimeType);
```

FIGS. 8A-8B illustrates an example constructor 350 for use with configuration modularity, in accordance with an embodiment. In particular, FIGS. 8A-8B illustrates a ConfigBeanDefaultValue which has two constructors as shown, wherein each ConfigBeanDefaultValue represent one config-bundle element.

Merging of Module Configuration with Domain Configuration

In accordance with an embodiment, the configuration for each config bean can be read from one of the multiple configuration sources described above when needed. It is not necessary to store the configuration into the central configuration file as long as the configuration stays the same as that included in the module. Instead, storing only happens when the user issues a create-module-config command, or when the configuration changes due to user's action changing the configuration.

Guidelines for Developing Config Beans

This section explains how to develop new config beans for different types of configuration that a config bean may require.

Type 1: Elements Only with No Attributes

In accordance with an embodiment, if a configuration does not need to have a custom value for an attribute and only includes XML elements, then the user does not need to take any action. For example, if the default configuration for the service appears like the following listing, then there is no need to include the central configuration file:

```
<web-container>
<session-config>
<session-manager>
<manager-properties></manager-properties>
```

```
            </session-manager>
            <session-properties></session-properties>
        </session-config>
    </web-container>
```

In accordance with an embodiment, a @NotNull annotation can be used on the getter methods of any element that should be present in the nested elements that are required as part of the default service configuration. The following code listing shows a portion of the Config class using @NotNull on the getMonitoringService( ) method. The @NutNull guarantees that an instance of MonitoringService config bean will be returned on invocation of the method in case the central configuration file does not have any corresponding configuration:

```
public interface Config extends ConfigBeanProxy, Injectable, Named,
PropertyBag, SystemPropertyBag, Payload, ConfigLoader {
//... additional code where appropriate
@Element(required=true)
@NotNull
MonitoringService getMonitoringService( );
//... additional code where appropriate
}
```

However, in accordance with an embodiment, the instance may not be fully initialized with all required sub elements and attributes unless the defaultValue (in Java, or default-value in XML) is used with the @Attribute annotation and also the @NotNull with the getter methods of the MonitoringService member properties. The following code portion taken from MonitoringService class shows how a combination of @Element and @NotNull can be used to ensure that the member objects are created with default values when the method is invoked in case it is null:

```
public interface MonitoringService extends ConfigBeanProxy, Injectable,
PropertyBag, ConfigExtension {
//... additional code where appropriate
@Element
@NotNull
public ModuleMonitoringLevels getModuleMonitoringLevels( );
//... additional code where appropriate
}
```

In accordance with an embodiment, careful use of placeholders enables avoiding storing several elements in the central configuration file. For example, for web-container, ejb-container, mdb-container, and transaction-service, the default configuration for these services can be kept in the config beans in the code.

Type 2: Single Element with Attribute Values

In accordance with an embodiment, if the default configuration for a service requires a single element with some attribute values, the defaultValue attribute of @Attribute can be used to embed the default value for the attribute in the code. An example of this type of configuration is included below:

```
<connector-service shutdown-timeout-in-seconds="30">
</connector-service>
```

The following listing represents the config bean which this configuration represents without having the default value for the shutdown-timeout-in-seconds attribute included in the code:

```
@Configured
public interface ConnectorService extends ConfigExtension,
ConfigBeanProxy, Injectable, PropertyBag {
// ... additional code where appropriate
@Min(value=1)
public String getShutdownTimeoutInSeconds( );
// ... additional code where appropriate
}
```

In the following sample code, which is a portion of the ConnectorService config bean, a defaultValue annotation attribute for the getShutdownTimeoutInSeconds method is used to provide an opportunity to not include anything in central configuration file initially nor need to carry a module configuration/hard coded element in central configuration file for this configuration element:

```
@Configured
public interface ConnectorService extends ConfigExtension,
ConfigBeanProxy, Injectable, PropertyBag {
// ... additional code where appropriate
@Attribute (defaultValue="30")
@Min(value=1)
public String getShutdownTimeoutInSeconds( );
// ... additional code where appropriate }
```

Type 3: Default Configurations with Custom Tokens

In accordance with an embodiment, if a service configuration has an inner list of elements like the following listing. In this case a module-configuration file must be created and provided with the module:

```
<jmsservice defaultjmshost=" default_JMS_host"
type="EMBEDDED">
<jmshost port="7676" host="localhost"
name="default_JMS_host"/>
</jmsservice>
```

Module Configuration Files

In accordance with an embodiment, the module configuration file should conform to the provided XML schema to be parsed and utilized by the configuration modularity framework. The file indicates how the customization tokens should be described, as well as how the configuration itself should appear as CDATA under the configuration-element. The configuration element CDATA can be provided in the central configuration file as relevant configuration for the specified location.

In accordance with an embodiment, if a custom configuration does not have any customization token, it is not necessary to add any customization token. If a config bean does not need custom configuration, yet its behavior can be customized during domain creation, then just the customization tokens can be included, leaving the configuration element empty. The module configuration file can be placed in the module's source directory, and picked up by, e.g., Maven, which understands this structure and can pick the file and bundle them with the binary (JAR file) of the module.

In accordance with an embodiment, a build system can merge the content of the resources with the jar file top level directory to provide a META-INF/configuration and the module configuration file(s) in the resulting JAR file.

Associating a Module Configuration File to a Config Bean

In accordance with an embodiment, an annotation named @CustomConfiguration can be used to mark config beans that have custom configuration. The annotation has two attributes for specifying the configuration file names, one for default-config (if it is different) configuration and the other one for admin cases. If no value is specified for them the default value, then a module-configuration.xml will be used. The file must be under META-INF/configuration directory of the JAR file. Developers can specify the file name if they want to use a custom file name or if the configuration for default-config and Admin are different. The following listing shows how to annotate JmsService config bean to use a custom file name for default-config and DAS configuration.

```
@HasCustomizationTokens
@CustomConfiguration(configFileBaseName = "jms-service.xml")
public interface JmsService extends ConfigExtension, Injectable,
PropertyBag {
// ... additional code where appropriate
}
```

The above annotations instruct the system that this config bean has custom configuration and it has tokens that user can customize during domain creation.

Configuration Stacking

In accordance with an embodiment, configuration stacking provides the infrastructure needed to replace the configuration of an upstream distribution with a downstream products' provided configuration. To achieve this a configuration-rank attribute can be used to specify the current configuration rank of the configuration in the habitat. Config beans can have an attribute named configuration-rank with default value of 0 which will not be shown in central configuration file or module configuration file per @Attribute(defaultValue=" ") design.

For example, in accordance with an embodiment, the following values for configuration-rank property are considered: 0, which is the default value GlassFish open source, base distribution; 1 GlassFish closed source; 2 WLS; 3 . . . . . The following code listing shows how the attribute will look like at ConfigBeanProxy level. The value of this attribute is set when a configuration other than the GlassFish open source configuration is being used for a config bean.

```
/**
* Gets the value of the stackPosition property.
* Specifies what is the stack position of this configuration.
*/
@Attribute(defaultValue = "0")
@NotNull
String getConfigurationRank( );
```

In accordance with an embodiment, using the configuration-rank attribute a module configuration file can optionally override the configuration at config bean level. For example if the module's configuration contains 3 different config-bundles, then each one of them can have it's own configuration-rank to control the configuration swapping at the config bean level, rather than at module's configuration file level.

Configuration Replication

In accordance with an embodiment, configuration modularity can interoperate and have no interference with cluster config replication. With a cluster it must be determined to either accept the default configuration of the cluster for the instances, or fine tune the configuration to match specific requirements.

Configuration Layering

In accordance with an embodiment, utilizing the module configuration file, the possibility to process a configuration on startup, and use stack-position of ConfigBean Proxy and replace-if-exists attribute of config-bundle can address use cases that involve open/close configurations. For example, a GlassFish installation may be upgraded to a WebLogic installation, or to another product, e.g., with an enhanced web container.

Config Bean Extension

In accordance with an embodiment, configuration modularity depends on intercepting the call to access a config bean. Using the config bean extension mechanism makes it possible to benefit from pluggability of configuration at config bean level, and makes it possible for configuration modularity to intercept access to any type of config extension and not only Config and Domain extensions. Some of the places where this extension mechanism can be applied are listed below. For a config bean to support ConfigBeanExtension pattern, the config bean that provides configuration extension should have a method that returns a List<ExtensionInterfaceType> as shown below:

```
@Element("*")
List<ExtensionInterfaceType> getExtensions( );
```

Any extension of this config bean should extend ExtensionInterfaceType and thus it will be add-able to the list of extensions when needed. The config bean also requires to provide another method as shown below:

```
@ExtensionMethod
getExtensionByType(Class extensionType);
```

When this method is invoked to get an extension of the config bean the invocation will go through the configuration modularity to find the right extension and return it.

Shared Top Elements with Module Specific Inner Elements

In accordance with an embodiment, some of the elements in the central configuration file are shared between different services, for example the network-config element is a container of different protocols. Those protocol configurations belong to different modules but the network-config elemtn does not really belong to the modules that use protocols. Another example is transport element that is shared between any listeners that uses TCP. In accordance with an embodiment, configuration modularity makes it possible to specify a location any level deep (as long as it can be reached, created) to place a config bean.

For example, in accordance with an embodiment, a property can be inserted under the adminthread-pool using the following module configuration file:

```
<service-config>
<config-bundle
location="domain/configs/config[$CURRENT_INSTANCE_CONFIG_NAME]/
threadpools/
```

```
threadpool[adminthreadpool]"
replace-if-exist="true">
<customization-tokens/>
<configuration-element
Config-bean-class-name=
"org.jvnet.hk2.config.types.Property">
<![CDATA[
<property name="simple" value="simpler"></property>
]]>
</configuration-element>
</config-bundle>
</service-config>
```

In accordance with an embodiment, configuration modularity also supports intercepting configuration injection using HK2 annotations. This allows a config bean to be injected in one code section, and the injection interceptor can then determine whether the injection should be processed by the configuration modularity logic.

Use of Configuration Modularity with Cloud Environments

As described above, in accordance with an embodiment, a system and method can be used for providing configuration modularity in an application server, cloud platform, or other environment. For example, in a cloud computing environment, application server modules, e.g., WebLogic Server or GlassFish modules, can be embedded within the environment to provide various cloud platform functionalities. In accordance with an embodiment, the following terms are used herein:

PaaS Platform Component (PaaS Platform, Platform, CloudLogic): In accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Figure 9:
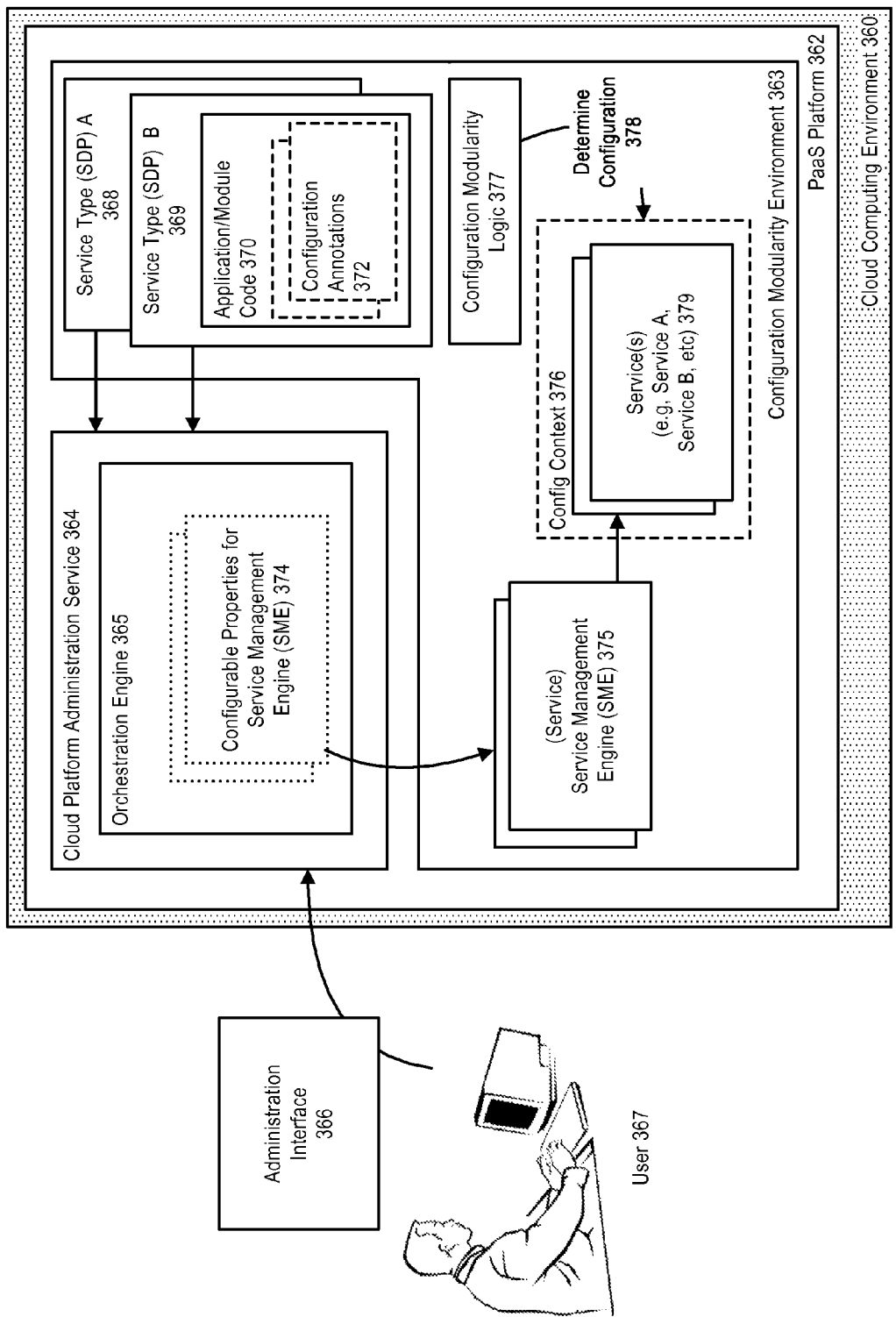
FIG. 9 illustrates the use of configuration modularity in a cloud platform environment, in accordance with an embodiment.

FIG. 9 illustrates the use of configuration modularity in a cloud platform environment, in accordance with an embodiment.

As shown in FIG. 9, in accordance with an embodiment, a cloud computing environment or cloud environment 360 can include a PaaS platform component 362 (referred to herein in some embodiments as a PaaS platform, or Cloud-Logic), which enables the provisioning of enterprise software applications within the environment, and which supports use of a modular configuration environment 363. For example, the PaaS platform can be provided as an installable software suite that provides a self-service provisioning experience for enterprise applications such as Fusion Middleware (FMW).

In accordance with an embodiment, the PaaS platform can include one or more service definition package (SDP), service management engine (SME), virtual assembly (VA), PaaS administration server, service domain including one or more service applications (apps) for use by one or more cloud accounts or tenants, and/or elasticity manager components.

In accordance with an embodiment, a PaaS administration server or service can be implemented as a WebLogic (WLS) server application, together with, e.g., GlassFish modules embedded therein to provide cloud platform functionality. A service domain, including a service app and service console, can be provided for housing enterprise applications, such as FMW applications, that will ultimately service user requests. In accordance with an embodiment, the service domain components may be instantiated multiple times as part of provisioning requests.

As described above, in accordance with an embodiment, a provider type is a special form of service type that supports providers instead of services, but which are similarly created based on an SDP, with additional configuration information supplied by the Platform Administrator, some of which configuration information may be specific to an installation or may reflect the Platform Administrator's choices of options supported by the SDP.

In accordance with an embodiment, provider server types that will be used by the PaaS administration server and the service domain, examples of which include LDAP, database, and Web tier or load-balancer providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

In accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an Oracle Virtual Assembly Builder, OVAB assembly) that contains the topology and configuration of a set of virtual appliances that will comprise a running instance of the enterprise application service, once the assembly is deployed onto a set of VMs.

For example, as shown in FIG. 9, in accordance with an embodiment, an administration service 364 and orchestration engine 365 provides an administration interface 366, which enables a user 367 to configure one or more SDPs 368, 369, including application/module code 370 and configuration annotations 372. During deployment of the SDP as services, configurable properties are determined 374 for use by SMEs 375. A config context is determined 376, and the configuration modularity logic 377 is used to determine a configuration 378 for the deployed services 379. This enables the configuration modularity logic to be applied both when initially installing a provider SDP with a particular software application installation, and also to support the addition of further provider SDPs later as necessary.

Service Definition Package

In accordance with an embodiment, each service definition package (SDP) can include a binary; a metadata (e.g., the SDP name, service type, version, vendor, or virtualization support metadata such as indicating whether the SDP supports OVAB, EC2, or Native); and one or more plugins that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

Service Management Engine

In accordance with an embodiment, a service management engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

In accordance with an embodiment, when OVAB is used as a virtualization provider, interaction with the OVAB Deployer can be handled by a virtualization API (e.g., an OVAB client API). The orchestration process can then proceed as follows: a Cloud Account Administrator can discover, e.g., SOA service types that are available in the PaaS platform domain, and initiate creation of an, e.g., SOA service. The orchestration engine iterates through the available service SMEs in the system, and determines which service SMEs can handle this service type. In this example, the orchestration engine can discover an appropriate SOA SME to handle creation of the SOA service. The orchestration engine can then call into the SME to get all provider dependencies for that SME. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME to provision the service.

Configuration Modularity Process

Figure 10:
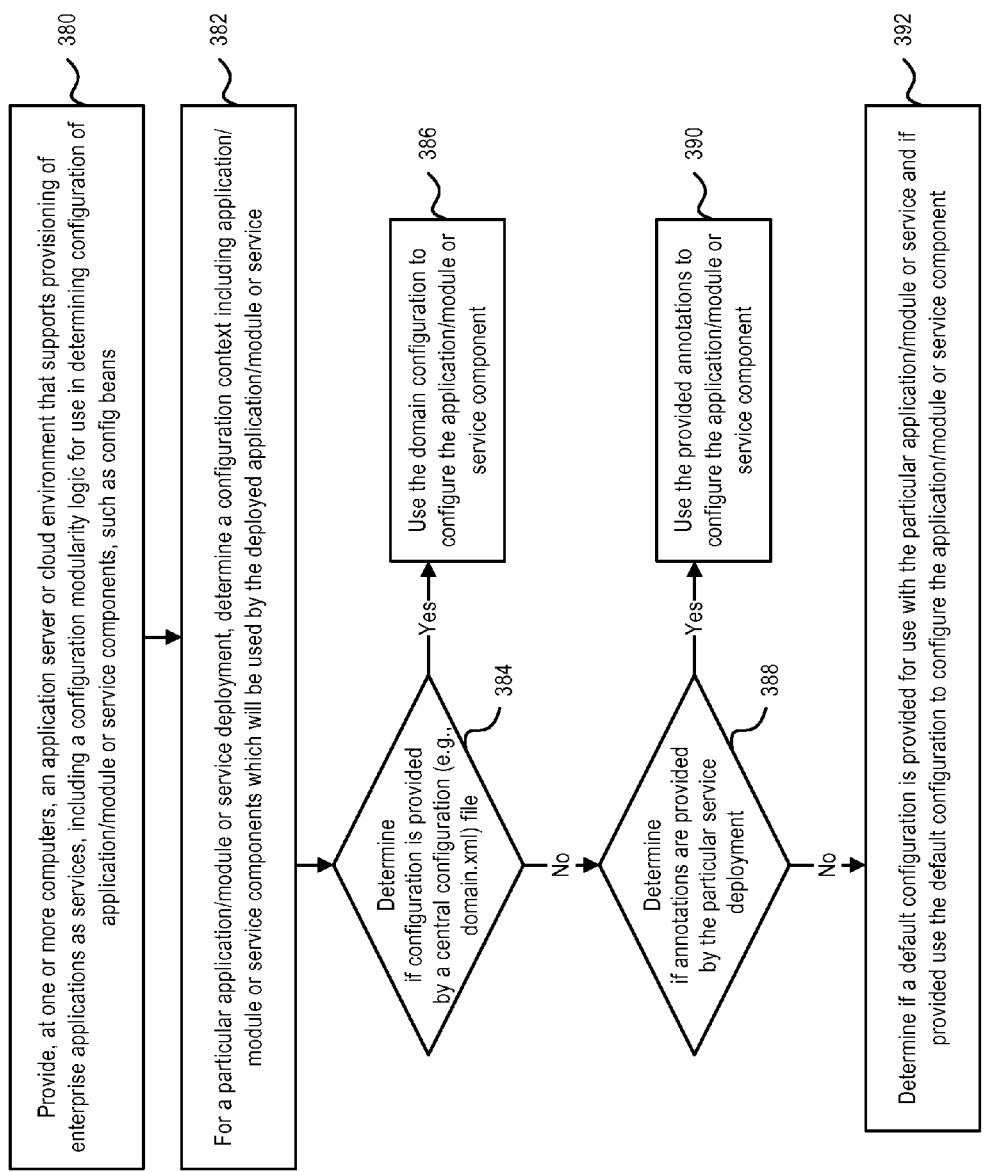
FIG. 10 shows a flowchart of a method for providing configuration modularity, in accordance with an embodiment.

FIG. 10 shows a flowchart of a method for providing configuration modularity, in accordance with an embodiment.

As shown in FIG. 10, in accordance with an embodiment, at step 380, an application server or cloud environment that supports provisioning of enterprise applications as services is provided, including a configuration modularity logic for use in determining the configuration of one or more application/module or service components (e.g., config beans).

At step 382, for a particular application/module or service deployment, a configuration context is determined, including the configuration of those components which will be used by the deployed application/module or service.

At step 384, a determination is made as to whether the configuration of components is provided by a domain configuration (e.g., a domain.xml) file.

At step 386, if it is determined that the configuration of components is provided by a domain configuration, then the domain configuration is used to configure the components.

At step, 388, otherwise a determination is made as to whether annotations are provided by the particular application/module or service deployment for use in configuring its components.

At step 390, if it is determined that annotations are provided by the particular application/module or service deployment for use in configuring its components, then the provided annotations are used to configure the components.

At step 392, otherwise a determination is made as to whether a default configuration is provided for use with the particular application/module or service and, if such default configuration is provided, then the default configuration is used to configure the application/module or service components.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the examples provided above illustrate the use of configuration modularity with Config-Beans and domain.xml files, the techniques described herein can similarly be used with other types of config beans and configuration files.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing configuration modularity in an application server, cloud platform, or other environment, comprising:

one or more computers including an application server or cloud environment executing thereon that supports provisioning of enterprise applications as services; and a configuration modularity logic for use in determining, upon receiving a request for a particular application or service deployment, a configuration of each application, module or service component of the particular application or service deployment, including determining whether a configuration is provided by a global or domain configuration, using, if provided by the global or domain configuration, the configuration to configure a config bean for each of the application, module or service components, determining, if the configuration for a config bean for one or more of the application, module or service components is not provided by the global or domain configuration, whether annotations are provided by the particular application or service deployment for use in configuring the config bean for the one or more of the application, module or service components, using, if provided by the particular application or service deployment, the annotations to configure the config bean for use by the one or more of the application, module or service components, determining, if the configuration for a config bean for one or more of the application, module or service components is not provided by the global or domain configuration and the annotations are not provided by the particular application or service configuration for use in configuring the config bean for the one or more of the application, module or service deployments, whether a default configuration is provided for use with the particular application or service deployment in configuring the config bean for the one or more of the application, module or service components, and using the default configuration to configure the config bean for the one or more of the application, module or service components.

2. The system of claim 1, wherein the application server or cloud environment includes one or more modules associated with a configuration file that provides configuration data for those modules and that is used by the configuration modularity logic to configure the modules for use within the application server or cloud environment.

3. The system of claim 1, wherein the system includes the application server, and wherein the system uses the configuration modularity logic to configure config beans for use by applications or modules deployed within the application server environment.

4. The system of claim 1, wherein the system includes the cloud environment, and wherein the system uses the configuration modularity logic to configure service definition packages for use by services deployed within the cloud environment.

5. A method of providing configuration modularity in an application server, cloud platform, or other environment, comprising:

providing, at one or more computers including an application server or cloud environment executing thereon that supports provisioning of enterprise applications as services, a configuration modularity logic; and determining, by the configuration modularity logic upon receiving a request for a particular application or service deployment, a configuration of each application, module or service component of the particular application or service deployment, including determining whether a configuration is provided by a global or domain configuration, using, if provided by the global or domain configuration, the configuration to configure a config bean for each of the application, module or service components, determining, if the configuration for a config bean for one or more of the application, module or service components is not provided by the global or domain configuration, whether annotations are provided by the particular application or service deployment for use in configuring the config bean for the one or more of the application, module or service components, using, if provided by the particular application or service deployment, the annotations to configure the config bean for the one or more of the application, module or service components, determining, if the configuration for a config bean for one or more of the application, module or service components is not provided by the global or domain configuration and the annotations are not provided by the particular application or service configuration for use in configuring the config bean for the one or more of the application, module or service deployments, whether a default configuration is provided for use with the particular application or service deployment in configuring the config bean for the one or more of the application, module or service components, and using the default configuration to configure the config bean for the one or more of the application, module or service components.

6. The method of claim 5, wherein the application server or cloud environment includes one or more modules associated with a configuration file that provides configuration data for those modules and that is used by the configuration modularity logic to configure the modules for use within the application server or cloud environment.

7. The method of claim 5, wherein the method is performed with the application server, including using the configuration modularity logic to configure config beans for use by applications or modules deployed within the application server environment.

8. The method of claim 5, wherein the method is performed with the cloud environment, including using the configuration modularity logic to configure service definition packages for use by services deployed within the cloud environment.

9. A non-transitory computer readable storage medium, including instructions stored thereon which when read and executed by one or more computers cause the one or more computers to perform the method comprising:

providing, at one or more computers including an application server or cloud environment executing thereon that supports provisioning of enterprise applications as services, a configuration modularity logic; and determining, by the configuration modularity logic upon receiving a request for a particular application or service deployment, a configuration of each application, module or service component of the particular application or service deployment, including determining whether a configuration is provided by a global or domain configuration, using, if provided by the global or domain configuration, the configuration to configure a config bean for each of the application, module or service components, determining, if the configuration for a config bean for one or more of the application, module or service components is not provided by the global or domain configuration, whether annotations are provided by the particular application or service deployment for use in configuring the config bean for the one or more of the application, module or service components, using, if provided by the particular application or service deployment, the annotations to configure the config bean for the one or more of the application, module or service components, determining, if the configuration for a config bean for one or more of the application, module or service components is not provided by the global or domain configuration and the annotations are not provided by the particular application or service configuration for use in configuring the config bean for the one or more of the application, module or service deployments, whether a default configuration is provided for use with the particular application or service deployment in configuring the config bean for the one or more of the application, module or service components, and using the default configuration to configure the config bean for the one or more of the application, module or service components.

10. The non-transitory computer readable storage medium of claim 9, wherein the application server or cloud environment includes one or more modules associated with a configuration file that provides configuration data for those modules and that is used by the configuration modularity logic to configure the modules for use within the application server or cloud environment.

11. The non-transitory computer readable storage medium of claim 9, wherein the method is performed with the application server, including using the configuration modularity logic to configure config beans for use by applications or modules deployed within the application server environment.

12. The non-transitory computer readable storage medium of claim 9, wherein the method is performed with the cloud environment, including using the configuration modularity logic to configure service definition packages for use by services deployed within the cloud environment.

13. The system of claim 1, wherein the configuration modularity logic is invoked by intercepting a call to access a config bean for each of the application, module or service components.

14. The system of claim 1, wherein determining a configuration of each application, module or service component of the particular application or service deployment includes populating placeholders in an object graph of the config bean for each of the application, module or service components with appropriate configuration information.

15. The system of claim 4, further comprising:

a service management engine for
deploying an instance of the particular application or service deployment using the configured service definition package,
provisioning the instance of the particular application or service deployment, and
managing a lifecycle of the instance of the particular application or service deployment;
wherein, upon receiving an instruction to deploy the instance of the particular application or service, the service management engine determines a config context and applies the configuration modularity logic to the deployed the instance of the particular application or service.

16. The method of claim 5, wherein the configuration modularity logic is invoked by intercepting a call to access a config bean for each of the application, module or service components.

17. The method of claim 5, wherein determining a configuration of each application, module or service component of the particular application or service deployment includes populating placeholders in an object graph of the config bean for each of the application, module or service components with appropriate configuration information.

18. The method of claim 8, further comprising:
providing a service management engine for
deploying an instance of the particular application or service deployment using the configured service definition package,
provisioning the instance of the particular application or service deployment, and
managing a lifecycle of the instance of the particular application or service deployment;
wherein, upon receiving an instruction to deploy the instance of the particular application or service, the service management engine determines a config context and applies the configuration modularity logic to the deployed the instance of the particular application or service.

19. The non-transitory computer readable storage medium of claim 9, wherein the configuration modularity logic is invoked by intercepting a call to access a config bean for each of the application, module or service components.

20. The non-transitory computer readable storage medium of claim 9, wherein determining a configuration of each application, module or service component of the particular application or service deployment includes populating placeholders in an object graph of the config bean for each of the application, module or service components with appropriate configuration information.

* * * * *

UNITED STATES PATENT AND TRADEMARK OFFICE
CERTIFICATE OF CORRECTION

PATENT NO.         : 9,898,344 B2
APPLICATION NO.    : 14/476583
DATED              : February 20, 2018
INVENTOR(S)        : Kalali Page 1 of 1

It is certified that error appears in the above-identified patent and that said Letters Patent is hereby corrected as shown below:

In the Specification

In Column 12, Line 52, delete "elemtn" and insert -- element --, therefor.

In the Claims

In Column 20, Line 12, in Claim 1, after "for" delete "use by".

Signed and Sealed this
Twenty-fifth Day of September, 2018

Andrei Iancu
*Director of the United States Patent and Trademark Office*